Patented July 8, 1924.

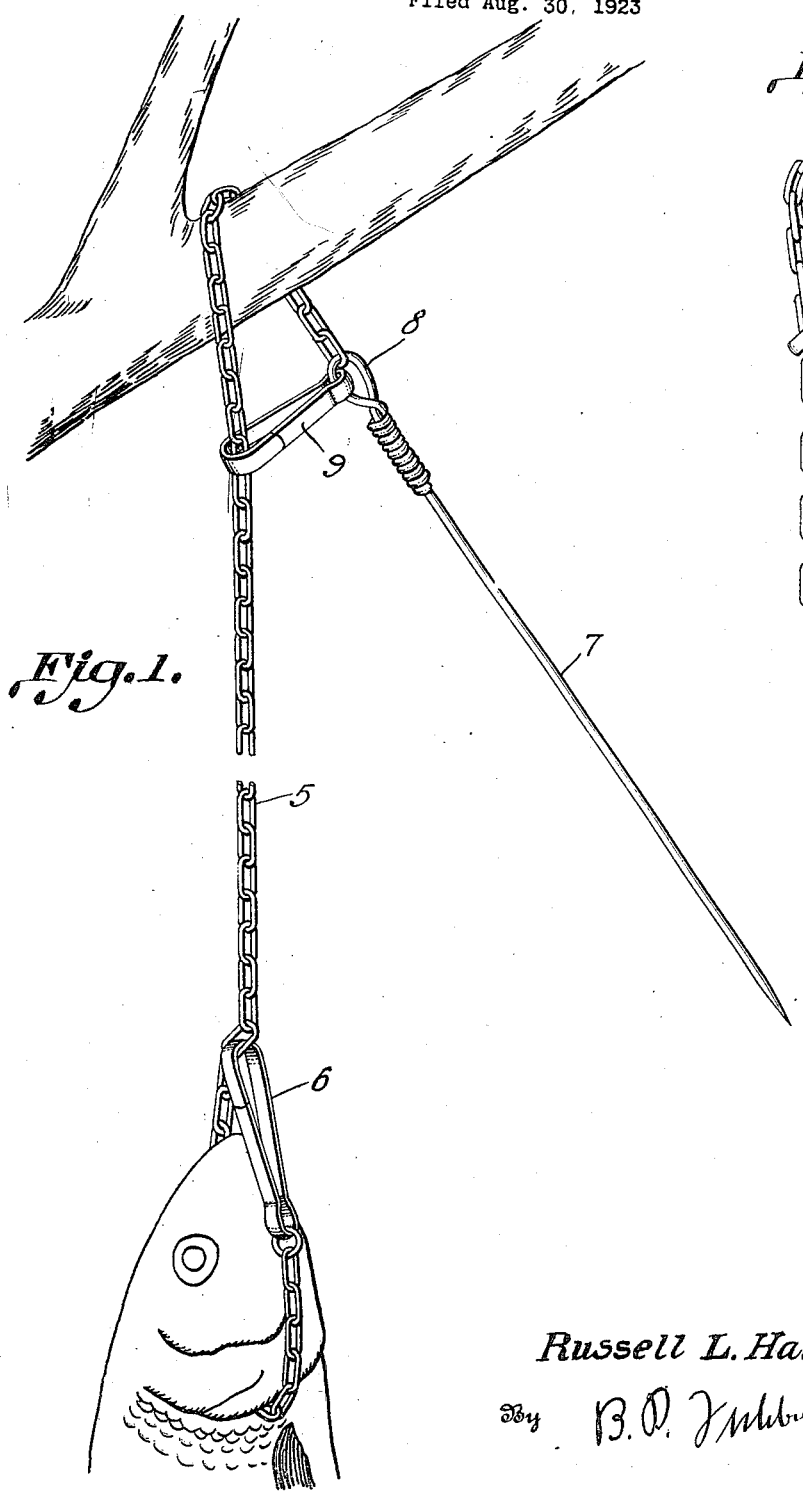

1,500,613

UNITED STATES PATENT OFFICE.

RUSSELL L. HALLOWAY, OF NEVADA, IOWA.

FISH-STRINGING DEVICE.

Application filed August 30, 1923. Serial No. 660,200.

*To all whom it may concern:*

Be it known that I, RUSSELL L. HALLOWAY, a citizen of the United States, residing at Nevada, in the county of Story and State of Iowa, have invented certain new and useful Improvements in Fish-Stringing Devices, of which the following is a specification.

The present invention relates to improvements in fish stringing devices.

An important object of the invention is to provide a device of the above mentioned character upon which the fish may be easily and quickly strung, and which may be secured to a support, such as a stake, limb or stone, in a secure manner, and be removed therefrom quickly and easily.

A further object of the invention is to provide a device of the above mentioned character, having a needle for stringing the fish upon the flexible element, which needle also serves as a handle for shifting the snap hook, so that it may be brought to a position for convenient operation.

Other objects and advantages of the invention will be apparent during the course of the following description.

In the accompanying drawings, forming a part of this specification, and in which like numerals are employed to designate like parts throughout the same, Figure 1, is a side elevation of a fish stringing device, embodying my invention, and Figure 2 is an elevation at a right angle to Figure 1, parts broken away.

In the drawings, wherein for the purpose of illustration is shown a preferred embodiment of my invention, the numeral 5 designates a flexible element, preferably in the form of a chain. Attached to one end of this chain is a snap hook 6, which is adapted to engage within a selected link of the chain.

The numeral 7 designates a needle, which may be formed of wire or the like, having its rear end bent into the form of an eye 8. This eye is attached to the opposite end of the chain 5, as shown.

Secured to the eye 8 is a snap hook 9, adapted to receive therein the chain 5.

In the use of the device, the first fish is strung upon the chain 5 by passing the needle 7 through the gills of the fish. The fish is passed downwardly upon the chain, and the snap hook 6 is then engaged within a selected link of the chain, as clearly shown in Figure 1. This first fish will serve as a stop to prevent the other fish from slipping off of the chain. The upper or forward end of the line is now passed about a support, and the snap hook 9, engaged about the chain 5. The device is therefore securely held to the support.

It frequently happens that the fish will pull the end of the chain looped about the support, tightly against the same, making it difficult to release the hook. Also, the hook 9 may slide down the chain away from the support. In either event the operator grasps the needle 7 in the hand, and uses it as a handle to slide the snap hook 9 to a convenient position, whereby it may be readily opened, to release the chain 5. The snap hook 9 is of course loosely mounted upon the eye 8 and will not interfere with the function of the needle in stringing the fish.

It is to be understood that the form of our invention herewith shown and described is to be taken as a preferred example of the same, and that various changes in the shape, size, and arrangement of parts may be resorted to without departing from the spirit of our invention or the scope of the subjoined claims.

Having thus described my invention, what I claim is,

1. A fish stringing device comprising a flexible element, a needle secured to one end of the flexibel element, a hook carried by the needle and adapted for slidable engagement with the flexible element, and means to prevent the fish from passing off of the opposite end of the flexible element.

2. A fish stringing device comprising a chain, a needle having an eye which is attached to one end of the chain, a hook loosely mounted upon the eye and slidably receiving the chain, said needle serving as a handle to move the hook longitudinally of the chain, and a hook attached to the opposite end of the chain and adapted to engage within a selected link of the chain near such opposite end.

In testimony whereof I affix my signature.

RUSS. HALLOWAY,